A. HAMMER.
Cooler for Breweries.

No. 47,298.  Patented April 18, 1865.

Witnesses
J. Romaine Brown
William Inskeep

Inventor
A. Hammer

UNITED STATES PATENT OFFICE.

ADOLPH HAMMER, OF NEW YORK, N. Y.

IMPROVED COOLER FOR BREWERIES.

Specification forming part of Letters Patent No. 47,298, dated April 18, 1865.

*To all whom it may concern:*

Be it known that I, ADOLPH HAMMER, of the city, county, and State of New York, have invented a new and Improved Cooler for Breweries; and I do hereby declare that the following is a full, clear, and exact description thereof, which will enable those skilled in the art to make and use the same, reference being had to the accompanying drawings, forming part of this specification, in which—

Figure 1:
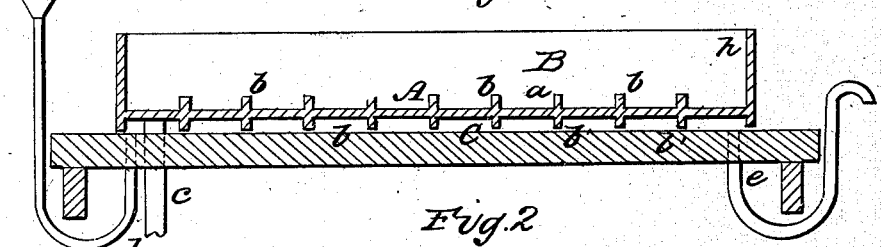
Figure 2:
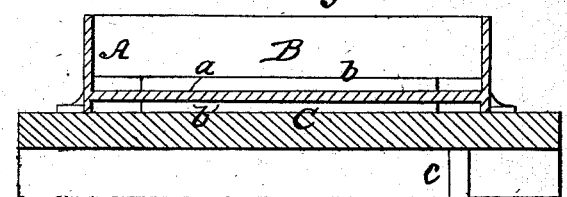
Figure 3:
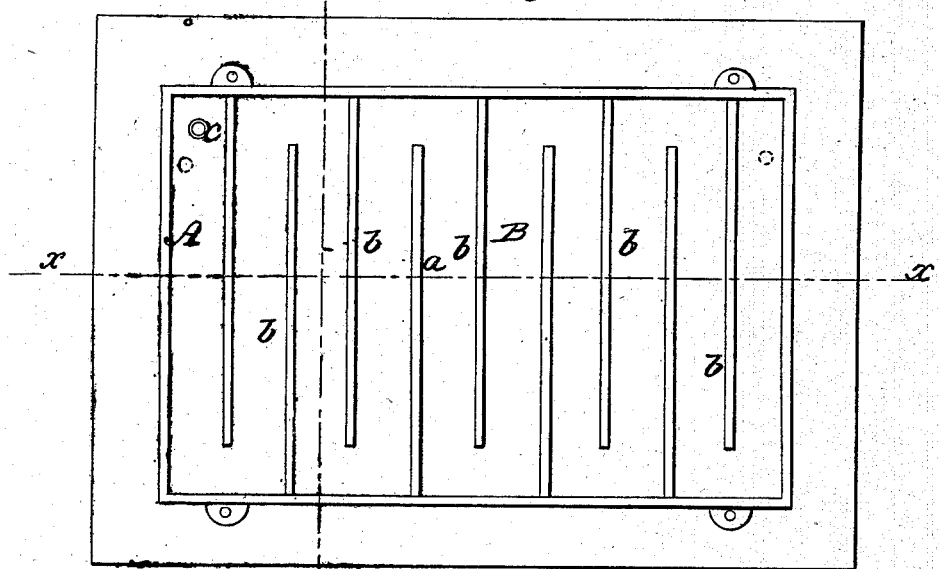

Figure 1 represents a longitudinal vertical section of this invention, the line $x\ x$, Fig. 3, indicating the plane of section. Fig. 2 is a transverse vertical section of the same, taken in the plane indicated by the line $y\ y$, Fig. 3. Fig. 3 is a plan or top view of the same.

Similar letters of reference indicate corresponding parts.

This invention consists in a cooler divided in two chambers by a horizontal partition, which is provided on its top and bottom with zigzag flanges in such a manner that the wort or other liquid to be cooled can be passed in an indirect current through the upper chamber, while an opposing current of the cooling-liquid passes through the lower chamber, and the cooling of the wort can be effected in a shallow pan in a short time, and, when covered, without exposing the wort to the decomposing influence of the atmosphere.

A represents a pan, made of wood or any other suitable material in the same manner and shape in which coolers of breweries are usually made. This pan is divided in two chambers, B C, by means of a horizontal partition, $a$, made of copper, tinned sheet-iron, or other suitable material, which is capable to resist the chemical action of the wort, and which is also a good conductor of heat. From the upper and lower surface of this horizontal partition rise zigzag flanges $b\ b'$—that is to say, flanges which alternately commence on the opposite sides of the pan and do not extend clear across, as clearly shown in Fig. 3 of the drawings. By these flanges the wort or other liquid which is made to run into the pan at one corner—for instance, at the corner $h$—is compelled to run through the pan in an indirect course before it is allowed to pass off through the discharge-opening $c$. At the same time the cooling-liquid is introduced through the pipe $d$, which is situated near the discharge-opening $c$, and it passes in an indirect current from the pipe $d$ under the partition $a$ to the discharge-pipe $e$. It will thus be seen that the current of the cooling-liquid is in a direction opposite to the liquid to be cooled, and the operation of cooling wort or other liquid can be effected in a short time and with little trouble.

In order to protect the wort against the decomposing influence of the atmospheric air, I propose to cover up the pan and to effect the cooling simply by the effect of the current of cold water passing through under the partition $a$.

In practice the pan A will be made in several sections, which are fastened together by screw bolts or rivets passing through adjoining flanges of said sections, and ears or lugs $f$, projecting from the sides of the pan, serve to secure the same down upon a platform of wood or any other suitable material, india-rubber or other packing being placed between the lower edge of the pan and said platform, to prevent leakage.

I claim as new and desire to secure by Letters Patent—

The horizontal partition $a$, with a double set of zigzag flanges, $b\ b'$, one above and the other below, in combination with the pan A, constructed and operating substantially as and for the purpose set forth.

A. HAMMER.

Witnesses:
   J. ROMAINE BROWN,
   WILLIAM INSKEEP.